United States Patent [19]

Conee

[11] Patent Number: 4,501,401

[45] Date of Patent: Feb. 26, 1985

[54] CAMERA SUPPORT CUSHION

[76] Inventor: Paul T. Conee, 99 N. Beacon St., Hartford, Conn. 06105

[21] Appl. No.: 422,858

[22] Filed: Sep. 24, 1982

[51] Int. Cl.$^3$ .............................................. A47G 29/00
[52] U.S. Cl. ....................................... 248/346; 248/1; 354/293; D6/596
[58] Field of Search ............................ 248/102, 346, 1; 206/316; 150/52 J; 5/455, 442, 449, 450; D6/201; 354/293, 294; 297/456

[56] References Cited

U.S. PATENT DOCUMENTS

| | | | |
|---|---|---|---|
| 1,778,545 | 10/1930 | Allen | 248/102 |
| 2,219,974 | 10/1940 | Bellow | 248/346 |
| 2,450,927 | 10/1948 | Allen | 248/102 |
| 2,589,303 | 3/1952 | Sourbeck | 5/442 |
| 2,806,131 | 9/1957 | Palmer | 248/1 |
| 2,956,287 | 10/1960 | Stanford | 248/1 |
| 3,216,681 | 11/1965 | Tagliavia | 248/346 |
| 3,411,164 | 11/1968 | Sumergrade | 5/442 |
| 3,767,094 | 10/1973 | Sikes | 248/346 |
| 3,863,882 | 2/1975 | Hatcher | 248/1 |
| 4,130,263 | 12/1978 | Roericht | 248/346 |
| 4,162,696 | 7/1979 | Sprung | 248/346 |
| 4,192,329 | 3/1980 | Swearingen | 248/1 |

OTHER PUBLICATIONS

"McCall's 2159" *McCall's Needlework Patterns,* (Feb.–Mar. 1960), p. 445.

*Primary Examiner*—J. Franklin Foss
*Assistant Examiner*—David L. Talbott

[57] ABSTRACT

A cushion is provided for supporting a camera in a multiplicity of stable positions upon a wide variety of support surfaces. The cushion will generally be constructed of a fabric-like material, and will have internal walls dividing the internal space into a plurality of compartments. The compartments are filled with a free-flowing particulate solid material, thereby enabling the cushion to conform to the camera and to the surface upon which it is to be seated. Ideally, the cushion will have a "super elliptical" configuration, providing numerous stable positions and an ideal support surface for the camera, while minimizing the possibility of obstructing the view of the lens.

12 Claims, 7 Drawing Figures

CAMERA SUPPORT CUSHION

BACKGROUND OF THE INVENTION

It is, of course, common practice to utilize a tripod or like device for supporting a camera, thereby enabling extended exposures to be made, permitting automatic operation and, indeed, allowing the photographer to participate as a subject of the picture. Devices of this nature are, however often cumbersome and unweildy, and often they cannot be set-up as quickly as might be desired.

As an alternative to a tripod, the camera may simply be steadied against any available stationary or steady structure; typically, a table or chair may be used indoors, and for outside photography a rock, a fence post, a tree, a building, or an automobile may, for example, conveniently be employed. Dependence upon such improvised support is often, however, less than satisfactory, because it may limit the range of positioning of the camera, and will not normally accommodate to, and therefore firmly hold, the camera; moreover, it is of course entirely possible that suitable structure may simply not be available when and where needed.

Sand-filled bags have been used for positioning and supporting cameras, but that practice is also undesirable for a number of reasons. Firstly, such bags tend to be heavy and difficult to transport. Secondly, they are not molded to the shape of the camera with facility, and finally, once having been set-up they tend to sag and to revert to a non-conforming condition.

Accordingly, it is a broad object of the present invention to provide a novel article for stably supporting a camera on virtually any stationary structure that has horizontal support features.

It is a more specific object of the invention to provide a novel supporting cushion for a camera, which cushion can readily be molded to accommodate the shape of the camera and will retain its conformation to ensure firm support for the lens.

Another object of the invention is to provide such a cushion, which offers a wide choice of positions for the camera, and thereby facilitates framing of the scene to be photographed, and which is so configured as to avoid interference with the view of the lens.

Yet another object of the invention is to provide such an article, which is light in weight, highly portable, and of relatively simple construction, which article is, in addition, quickly and easily situated and employed for use.

SUMMARY OF THE INVENTION

It has now been found that the foregoing and related objects of the invention are readily attained in a cushion comprised of a substantially matched pair of panels, preferably of rounded-rectangular configuration, joined to one another in spaced relationship by a peripheral wall extending thereabout, and a plurality of spaced, generally parallel internal walls secured to the panels and the peripheral wall, and extending across the cushion. The panels and the peripheral wall cooperatively define a space within the cushion, and the internal walls divide the space into a multiplicity of compartments. A free-flowing filler material is contained within the cushion, and substantially completely fills the compartments therewithin. The panels and the peripheral wall are made of a relatively supple material, rendering the cushion readily conformable to the camera; the internal interior walls tie the panels and the peripheral wall together and confine the filler material, thereby limiting and localizing distortion caused by forces exerted upon the cushion, and minimizing buldging, sagging and loss of form.

In the preferred embodiments, the panel configuration is that of a "super ellipse", the peripheral curvature of which is based upon the equation $X^n/A^n + Y^n/B^n = 1$, wherein "n" has the value $2\frac{1}{2}$, "X" and "Y" represent Cartesian coordinates, and "A" and "B" are constants of appropriate value. Normally, the peripheral wall of the cushion will be of uniform width throughout its length, and there will be at least four internal walls, which will generally extend perpendicularly to the longer sides of the panels. The compartments need not all be of the same width, and in some instances it will be desirable to construct the cushion with the compartment at one end wider than that at the opposite end; the "one end" compartment will thereby permit a greater degree of deformation than will the "opposite end" compartment, thus providing a stable base for seating of the cushion.

The filler material used will generally comprise a mass of relatively light weight particles, normally of smoothly rounded shape and advantageously of a synthetic resinous material. The supple material from which the panels and peripheral wall of the cushion (and generally also the interior dividing walls) are fabricated should be porous, to avoid any tendency for internal gas pressure to inhibit deformation; usually, a strong and durable fabric, of dark color and matte surface character, will be employed.

DETAILED DESCRIPTION OF THE ILLUSTRATED EMBODIMENT

Figure 1:
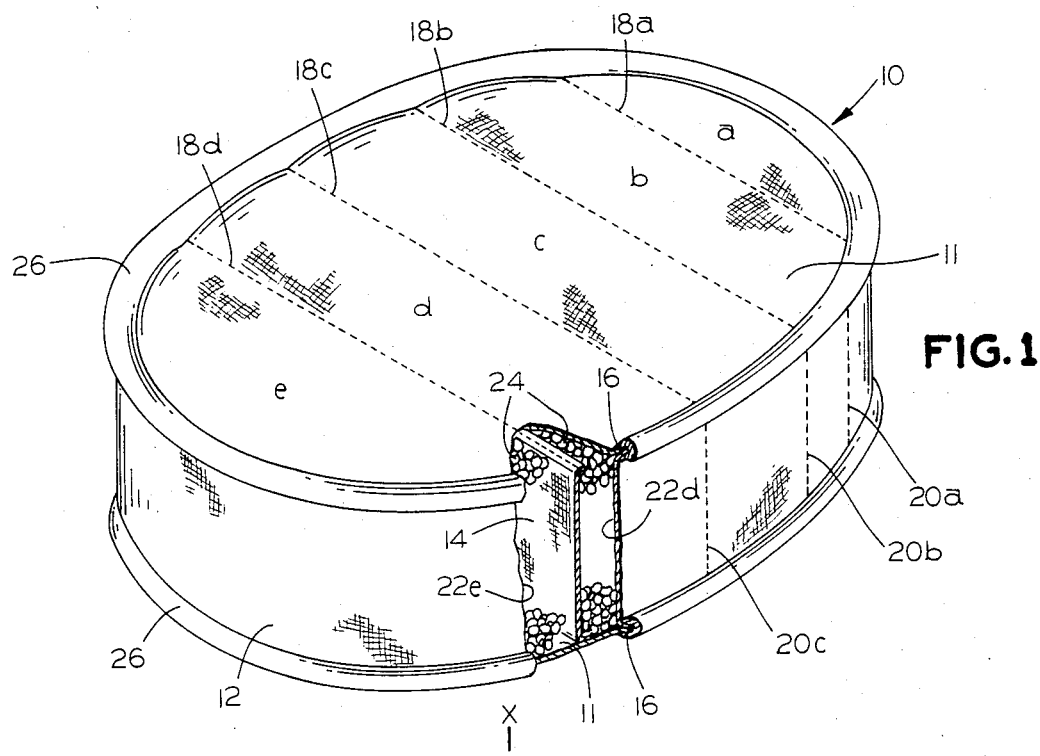
FIG. 1 is a perspective view of a camera support cushion embodying the present invention, with a portion broken away to illustrate internal features.
Figure 2:
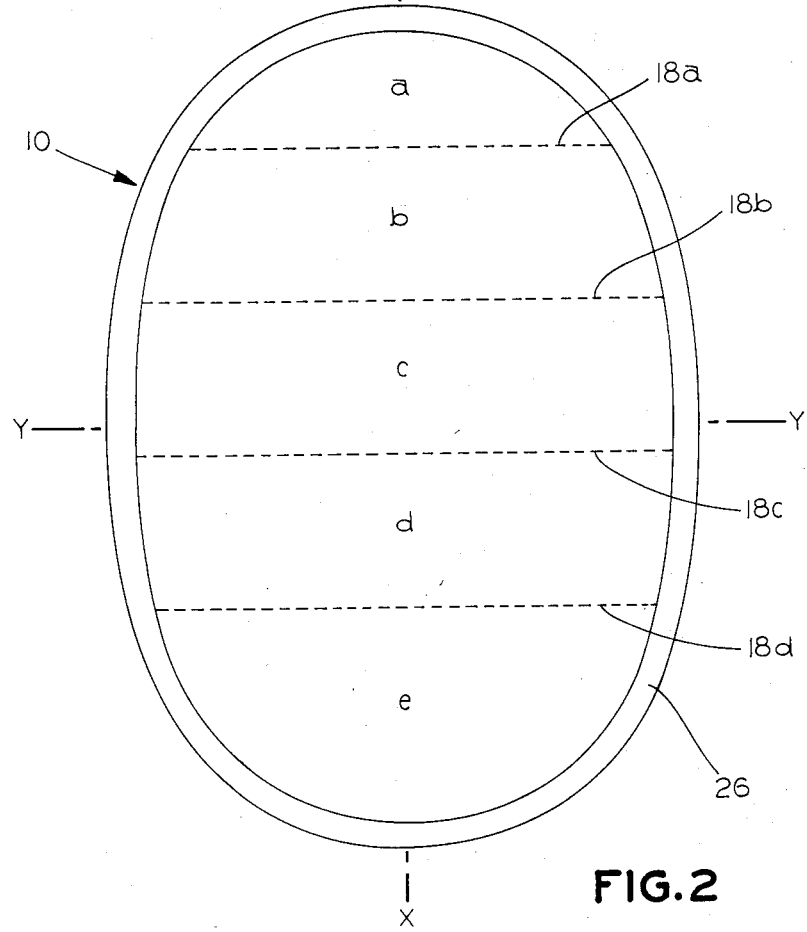
FIG. 2 is a plan view of the cushion of FIG. 1, showing its substantially "super elliptical" configuration.

Turning now in detail to FIGS. 1 and 2 of the drawings, therein illustrated is a cushion embodying the invention, generally designated by the numeral 10 and consisting of a pair of substantially identical outer panels 11 of "super elliptical" configuration, a peripheral sidewall strip 12 of uniform width extending thereabout, and four internal walls 14 (only one of which is visible). The foregoing are made of a supple, porous material, such as may be provided by canvas or a similar durable, all-weather fabric, and are joined by stitching along the seams 16, 18a–d, and 20a–d. The panels 11 and the sidewall strip 12 define an enclosed space, which is divided by the internal walls 14 into five compartments 22a–e, only two of which (22d and e) are visible. The compartments 22 are, in turn, virtually completely filled with a free flowing filler material 24, such as may be provided by a mass of relatively light-weight plastic beads or particles. The cushion is finished by securing welting strips 26 over the peripheral seams 16, which may be done as part of the seaming operations.

As indicated by the locations of the seams 18, 20, the compartments 22b–22d are of substantially the same width (i.e., distance along the "X" axis in FIG. 2). The width at compartment a is somewhat less than the other compartments, restricting deformation and preserving the elliptical contour, which configuration will well accommodate certain camera and lens combinations. The width of compartment e is somewhat greater than the others, permitting more deformation or moldability of that section of the cushion, and thereby offering enhanced stability when the cushion is seated in an upright position thereupon.

As best seen in FIG. 2, the panels 11, and consequently the cushion itself (in cross section), are of "super elliptical" configuration, which is an idealized rounded-rectangular shape produced by a curve represented by the formular $X^n/A^n + Y^n/B^n = 1$, wherein "n" is an exponent of value $2\frac{1}{2}$, "X" and "Y" are Cartesian coordinates of the curve (taken from the X and Y axis shown in the Figure), and "A" and "B" are suitable constants. The resultant configuration integrates the constantly curved periphery of a circle with the major and minor dimensional features of a rectangle, and is especially beneficial in the instant cushion. Specifically, the rounded-rectangular shape enables support of the camera at different elevations, with the cushion resting either upon one of its longer or shorter edges, or lying flat upon one of the panel surfaces; the edge curvature permits support of the camera with its len directed therealong, and since the surface curves away from the lens obstruction is avoided. Piet Hein, the Danish mathematician and designer, has been credited with deriving the mathematical basis for the "super-ellipse".

Figure 3:
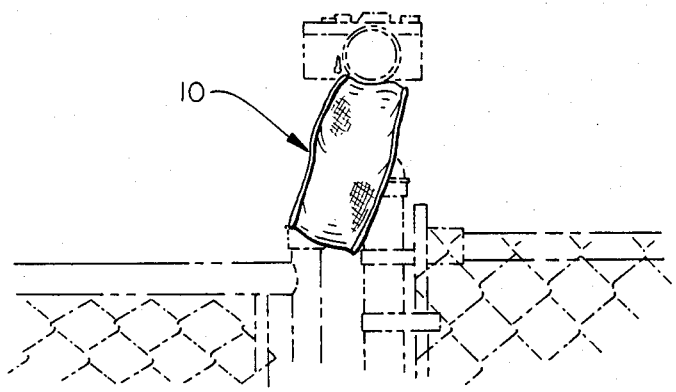
FIGS. 3–7 are elevational views illustrating the variety of positions in which the cushion of the invention can be used to support a camera upon various structures.
Figure 4:
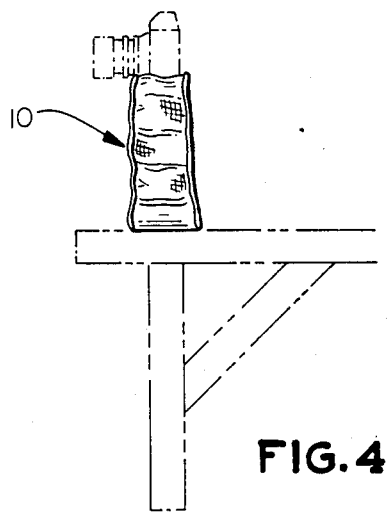

FIGS. 3–7 show several of the many ways in which the cushion of the invention can be used to support a camera. More particularly, FIG. 3 shows the cushion 10 disposed on edge and wedged between posts of a fence gate structure; the camera rests upon the upper edge of the cushion and is directed therealong. In FIG. 4, the cushion 10 is disposed on one of its shorter edges in an upright position, and is supported upon a bench; the camera lens is disposed in a direction transverse to (rather than aligned along) the edge.

Figure 5:
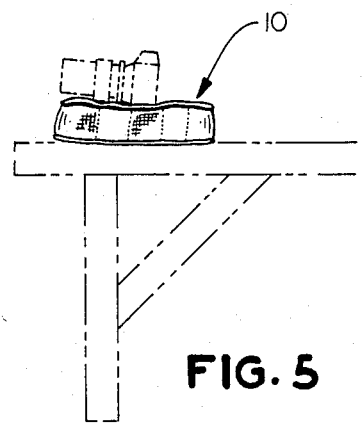
Figure 6:
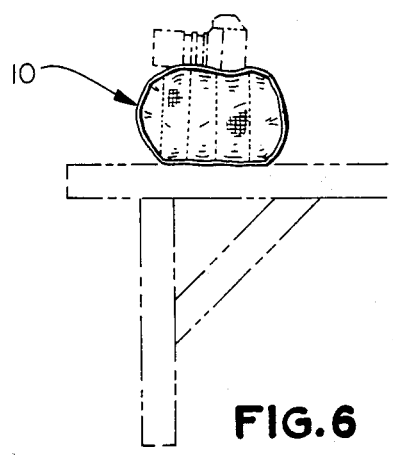
Figure 7:
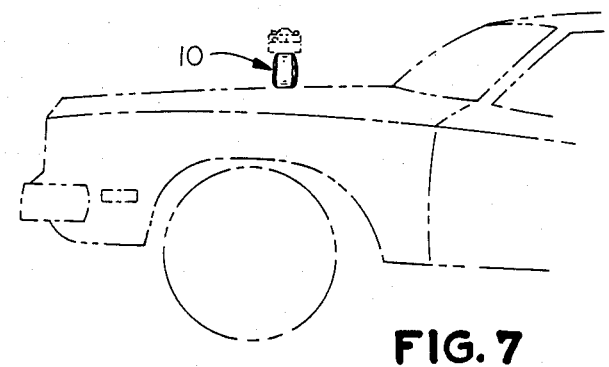

Maximum stability of support is achieved with the cushion lying directly upon one of its panels, and with the camera seated upon the opposite surface, as shown in FIG. 5. In FIG. 6, the cushion 10 is disposed on one or its longer edges, with the camera lens aligned along the opposite edge; this view perhaps best indicates the importance of the constant convature of the edge of the cushion in avoiding obstruction of the lens. FIG. 7 provides a further indication of the versatility of the cushion, showing it seated upon the hood of an automobile. If so desired, moreover, the cushion can be secured (such as by tying) to vertical and obliquely-disposed objects.

Although, as indicated above, the so-called "super ellipse" is regarded to be the ideal configuration for the cushion, it will be appreciated that other shapes can be employed. Preferably, the cushion will be longer in one direction that the other, and its edge will be curved so as to permit unobstructed support of the camera; i.e., it will be of rounded-rectangular configuration. The dimensions and relative proportions of the cushion can vary from those that are suggested by the drawings, and it may be desirable to manufacture the it in a variety of sizes, so as to best adapt the cushion to a particular size or type of camera; it will readily be appreciated, however, that any cushion made in accordance with the present invention will be adapted for use with many different cameras. In this regard, it should also be understood that the device is not limited to use in connection with cameras, and that it may serve many other purposes; for example, the cushion may be utilized to stabilize gun sights, telescopes, and the like.

The internal walls that divide the space within the cushion into discrete compartments are of prime importance to the invention. They enable localized deformation to permit conformation of the cushion to the camera, without distortion of its overall form and without buldging, sagging or loss of control. The partitioning walls effectively tie the other parts of the cushion (i.e., the panels and the peripheral strip) together, and confine the particulate filler material; consequently force upon one section of the cushion will not unduly deform an adjacent section. The number of internal walls (and hence of compartments within the cushion) may be varied from that illustrated, albeit that the construction shown appears to be optimal in a cushion of practical size; such a cushion may, for example, measure about 11 inches in length, 8 inches in width, and 3 inches in depth.

The cushion will most desirably be made of a durable, all-weather fabric, such as canvas or the like, which should be of a dark color and of a matte or relatively rough, surface character. Generally, it will be most desirable, from both a practical and also an aesthetic standpoint, to simply sew together the several pieces comprising the cushion. Although openings can be provided through which the free-flowing filler material can be introduced, which openings can subsequently to closed by appropriate means, preferably the filler will be introduced during production and permanently enclosed therewithin. This might best be accomplished by introducing the filler through seam openings, which will ultimately be sewn shut. Despite the preference for fabrics, it should be understood that supple plastic webs can also be employed in the construction of the cushion, provided that they exhibit the requisite characteristics, as described.

The nature of the filler material used may also vary considerably, as will be evident to those skilled in the art. It must of course be free flowing, and it should be relatively light in weight to maximize portability of the cushion and convenience of use. The preferred fillers will therefore normally be a particulate or bead-like thermoplastic resinous materials, which may moreover be foamed, so as to minimize weight. Beads of polystyrene, poly(vinyl chloride), and like resins will typically be used, and the surfaces of the particles should be smooth and rounded to promote free movement within the cushion compartments. While the filler material should substantially completely occupy the volume within the cushion, it will be evident that it should not be so fully packed as to inhibit adequate mobility, and thereby impose undue constraint upon conformability.

Thus, it can be seen that the present invention provides a novel article for supporting a camera on virtually any stationary structure that has horizontal support features. More specifically, a cushion is provided that can readily be molded to accommodate the shape of the camera, and that will retain its conformation to ensure firm support for the lens. It is light in weight, highly portable, and of relatively inexpensive and simple construction; it is, in addition, quickly and easily situated and emplaced for use, requiring virtually no set-up time or effort.

Having thus described the invention, what is claimed is:

1. A cushion for supporting a camera or the like, comprising: a substantially matched pair of panels joined to one another in spaced relationship by a peripheral wall extending thereabout, the configuration of said panels being that of a "super ellipse", the peripheral curvature of which is based upon the equation $X^n/A^n + Y^n/B^n = 1$, wherein "n" has the value $2\frac{1}{2}$, "X" and "Y" represent Cartesian coordinates, and "A" and "B" are constants of appropriate value, and said panels and said peripheral wall cooperatively defining a space within said cushion; and a free-flowing filler material contained within said cushion and substantially completely filling said space therewithin, said panels and said peripheral wall being made of a relatively supple material to permit deformation of said cushion and conformation to the camera.

2. The cushion of claim 1 additionally including a plurality of spaced, generally parallel internal walls secured to said panels and peripheral wall and extending across said cushion, said internal walls dividing said space within said cushion into a multiplicity of compartments substantially completely filled by said free-flowing filler material, and tying said panels and peripheral wall together and confining said filler material, thereby limiting and localizing distortion caused by forces exerted upon said cushion, and minimizing bulging, sagging and loss of form.

3. The cushion of claim 2 wherein said peripheral wall is of uniform width throughout its length, and wherein said internal walls extend generally perpendicularly to the longer sides of said panels.

4. The cushion of claim 2 wherein there are at least four of said internal walls.

5. The cushion of claim 2 wherein said compartments are not all of the same width.

6. The cushion of claim 5 wherein the compartment at one end of said cushion is wider than any of the other compartments thereof, said one end compartment permitting a greater degree of deformation than said other compartments, thus providing a stable base for seating of said cushion.

7. The cushion of claim 5 wherein the compartment at one end of said cushion is narrower than any of the other compartments, said one end compartment permitting a lessor degree of deformation than that at the opposite end thereof, thus providing a relatively defined configuration upon which to set various camera and lens combinations.

8. The cushion of claim 2 wherein said filler material comprises a mass of relatively light weight particles.

9. The Cushion of claim 8 wherein said particles are of smoothly rounded shape, and are of a synthetic resinous material.

10. The cushion of claim 2 wherein said supple material is a strong and durable porous fabric.

11. A shell adapted for use in a cushion for supporting a camera or the like, comprising: a substantially matched pair of panels joined to one another in spaced relationship by a peripheral wall extending thereabout, the configuration of said panels being that of a "super ellipse", the peripheral curvature of which is based upon the equation $X^n/A^n + Y^n/B^n = 1$, wherein "n" has the value $2\frac{1}{2}$, "X" and "Y" represent Cartesian coordinates, and "A" and "B" are constants of appropriate value, and said panels and said peripheral wall cooperatively defining a space within said shell for the containment of a free-flowing filler to thereby provide such a cushion, said panels and said peripheral wall being made of a relatively supple material to permit deformation of the cushion and conformation to the camera.

12. The shell of claim 11 wherein said supple material is a strong and durable porous fabric.

* * * * *